(12) United States Patent
Fabian et al.

(10) Patent No.: US 9,034,531 B2
(45) Date of Patent: May 19, 2015

(54) CONTROLLER FOR FUEL CELL OPERATION

(75) Inventors: Tibor Fabian, Mountain View, CA (US); Tobin J. Fisher, San Francisco, CA (US); Daniel Braithwaite, San Francisco, CA (US)

(73) Assignee: Ardica Technologies, Inc., San Francisco, CA (US)

( * ) Notice: Subject to any disclaimer, the term of this patent is extended or adjusted under 35 U.S.C. 154(b) by 647 days.

(21) Appl. No.: 12/583,925

(22) Filed: Aug. 26, 2009

(65) Prior Publication Data

US 2010/0173214 A1 Jul. 8, 2010

Related U.S. Application Data

(63) Continuation-in-part of application No. 12/322,337, filed on Jan. 29, 2009, now abandoned.

(60) Provisional application No. 61/062,961, filed on Jan. 29, 2008.

(51) Int. Cl.
*H01M 8/04* (2006.01)
*H01M 8/02* (2006.01)
*H01M 8/06* (2006.01)
*H01M 8/24* (2006.01)
*H01M 16/00* (2006.01)
*H01M 8/10* (2006.01)

(52) U.S. Cl.
CPC ........ *H01M 8/0273* (2013.01); *H01M 8/04067* (2013.01); *H01M 8/04089* (2013.01); *H01M 8/04231* (2013.01); *H01M 8/04402* (2013.01); *H01M 8/04552* (2013.01); *H01M 8/04753* (2013.01); *H01M 8/04761* (2013.01); *H01M 8/04776* (2013.01); *H01M 8/0491* (2013.01); *H01M 8/0606* (2013.01); *H01M 8/1097* (2013.01); *H01M 8/2475* (2013.01); *H01M 16/006* (2013.01); *H01M 2250/30* (2013.01); *Y02B 90/18* (2013.01); *Y02E 60/50* (2013.01)

(58) Field of Classification Search
USPC .......................... 429/416, 417, 408, 428, 443
See application file for complete search history.

(56) References Cited

U.S. PATENT DOCUMENTS 3,262,801 A   7/1966   Lally et al.
3,774,589 A   11/1973  Kober
(Continued)

FOREIGN PATENT DOCUMENTS

DE   4221492 A   1/1993
EP   1434292 A   6/2004
(Continued)

OTHER PUBLICATIONS

Written Opinion of te International Searching Authority for PCT/US2010/02022.
(Continued)

*Primary Examiner* — Jane Rhee
(74) *Attorney, Agent, or Firm* — Carr & Ferrell LLP

(57) ABSTRACT

The current invention is a fuel cell controller that includes a first control loop, where the first control loop is disposed to adjust a fuel cell current to regulate a hydrogen output pressure from the fuel cell to a pressure target valve, and further includes a second control loop disposed to adjust a hydrogen flow rate from a hydrogen generator to match a DC/DC power output to a power target value.

11 Claims, 4 Drawing Sheets

(56) References Cited

U.S. PATENT DOCUMENTS

| | | | |
|---|---|---|---|
| 3,895,102 A | 7/1975 | Gallagher | |
| 4,042,528 A | 8/1977 | Abe | |
| 4,261,956 A | 4/1981 | Adlhart | |
| 4,419,457 A | 12/1983 | Tokunaga | |
| 4,846,176 A | 7/1989 | Golden | |
| 5,182,046 A | 1/1993 | Patton et al. | |
| 5,804,329 A | 9/1998 | Amendola | |
| 5,817,157 A | 10/1998 | Checketts | |
| 5,948,558 A | 9/1999 | Amendola | |
| 6,106,801 A | 8/2000 | Bogdanovic et al. | |
| 6,250,078 B1 | 6/2001 | Amendola | |
| 6,326,097 B1 | 12/2001 | Hockaday | |
| 6,375,638 B2 | 4/2002 | Nason | |
| 6,392,313 B1 | 5/2002 | Epstein | |
| 6,433,129 B1 | 8/2002 | Amendola | |
| 6,458,478 B1 | 10/2002 | Wang et al. | |
| 6,461,752 B1 | 10/2002 | Leung | |
| 6,468,694 B1 | 10/2002 | Amendola | |
| 6,497,973 B1 | 12/2002 | Amendola | |
| 6,524,542 B2 | 2/2003 | Amendola | |
| 6,534,033 B1 | 3/2003 | Amendola | |
| 6,534,950 B2* | 3/2003 | LeBoe | 320/104 |
| 6,544,400 B2 | 4/2003 | Hockaday | |
| 6,544,679 B1 | 4/2003 | Petillo | |
| 6,579,068 B2 | 6/2003 | Bridger | |
| 6,586,563 B1 | 7/2003 | Ortega | |
| 6,645,651 B2 | 11/2003 | Hockaday | |
| 6,660,685 B1 | 12/2003 | Schussler | |
| 6,670,444 B2 | 12/2003 | Amendola | |
| 6,683,025 B2 | 1/2004 | Amendola | |
| 6,706,909 B1 | 3/2004 | Snover | |
| 6,713,201 B2 | 3/2004 | Bullock | |
| 6,723,072 B2 | 4/2004 | Flaherty | |
| 6,745,801 B1 | 6/2004 | Cohen | |
| 6,746,496 B1 | 6/2004 | Kravitz et al. | |
| 6,808,833 B2 | 10/2004 | Johnson | |
| 6,818,334 B2 | 11/2004 | Tsang | |
| 6,821,499 B2 | 11/2004 | Jorgensen | |
| 6,834,623 B2 | 12/2004 | Cheng | |
| 6,834,632 B2 | 12/2004 | Kataoka | |
| 6,840,955 B2 | 1/2005 | Ein | |
| 6,849,351 B2 | 2/2005 | Hartnack | |
| 6,887,596 B2 | 5/2005 | Leban | |
| 6,893,755 B2* | 5/2005 | Leboe | 429/411 |
| 6,916,159 B2 | 7/2005 | Rush | |
| 6,924,054 B2 | 8/2005 | Prasad | |
| 6,932,847 B2 | 8/2005 | Amendola et al. | |
| 6,939,529 B2 | 9/2005 | Strizki et al. | |
| 7,019,105 B2 | 3/2006 | Amendola et al. | |
| 7,083,657 B2 | 8/2006 | Mohring et al. | |
| 7,105,033 B2 | 9/2006 | Strizki | |
| 7,105,245 B2 | 9/2006 | Ohlsen | |
| 7,108,777 B2 | 9/2006 | Xu et al. | |
| 7,214,439 B2 | 5/2007 | Ortega et al. | |
| 7,220,290 B2 | 5/2007 | Amendola et al. | |
| 7,282,073 B2 | 10/2007 | Petillo et al. | |
| 7,316,718 B2 | 1/2008 | Amendola et al. | |
| 7,316,719 B2 | 1/2008 | Devos | |
| 7,323,148 B2 | 1/2008 | Shah et al. | |
| 7,393,369 B2 | 7/2008 | Shurtleff | |
| 7,527,661 B2 | 5/2009 | Chellappa et al. | |
| 7,530,931 B2 | 5/2009 | Amendola et al. | |
| 7,540,892 B2 | 6/2009 | Strizki et al. | |
| 7,579,806 B2 | 8/2009 | Okuto | |
| 7,645,536 B2 | 1/2010 | Akiyama | |
| 7,662,435 B2 | 2/2010 | Chellappa et al. | |
| 7,666,386 B2 | 2/2010 | Withers-Kirby | |
| 7,811,529 B2 | 10/2010 | Powell et al. | |
| 7,867,300 B2 | 1/2011 | Chellappa et al. | |
| 7,875,089 B2 | 1/2011 | Powell et al. | |
| 7,922,781 B2 | 4/2011 | Chellappa et al. | |
| 7,954,519 B2 | 6/2011 | Powell et al. | |
| 8,100,993 B2 | 1/2012 | Fisher et al. | |
| 8,118,893 B2 | 2/2012 | Rosenzweig et al. | |
| 8,361,668 B2 | 1/2013 | Mclean et al. | |
| 2001/0045364 A1 | 11/2001 | Hockaday et al. | |
| 2002/0114985 A1 | 8/2002 | Shkolnik et al. | |
| 2002/0182459 A1 | 12/2002 | Hockaday | |
| 2003/0009942 A1 | 1/2003 | Amendola | |
| 2003/0022034 A1* | 1/2003 | Suzuki | 429/13 |
| 2003/0037487 A1 | 2/2003 | Amendola | |
| 2003/0049505 A1* | 3/2003 | Kameya et al. | 429/25 |
| 2003/0077494 A1 | 4/2003 | Aberle et al. | |
| 2003/0082427 A1 | 5/2003 | Prasad | |
| 2003/0091879 A1 | 5/2003 | Rusta-Sellehy et al. | |
| 2003/0138679 A1 | 7/2003 | Prased | |
| 2003/0198558 A1 | 10/2003 | Nason | |
| 2003/0235724 A1 | 12/2003 | Ord | |
| 2004/0011662 A1 | 1/2004 | Xu | |
| 2004/0013923 A1 | 1/2004 | Molter et al. | |
| 2004/0048115 A1 | 3/2004 | Devos | |
| 2004/0048132 A1 | 3/2004 | Takai et al. | |
| 2004/0052704 A1 | 3/2004 | Devos | |
| 2004/0062965 A1 | 4/2004 | Morse | |
| 2004/0062978 A1 | 4/2004 | Yazici | |
| 2004/0096721 A1 | 5/2004 | Ohlsen et al. | |
| 2004/0131903 A1 | 7/2004 | Shioya | |
| 2004/0136156 A1 | 7/2004 | Nakamura et al. | |
| 2004/0148857 A1 | 8/2004 | Strizki | |
| 2004/0197214 A1 | 10/2004 | Arthur | |
| 2004/0202548 A1 | 10/2004 | Dai | |
| 2004/0211054 A1 | 10/2004 | Morse | |
| 2004/0219409 A1 | 11/2004 | Isogai | |
| 2004/0229101 A1 | 11/2004 | Davis | |
| 2004/0253500 A1 | 12/2004 | Bourilkov | |
| 2005/0023236 A1 | 2/2005 | Adams et al. | |
| 2005/0031931 A1 | 2/2005 | Kabumoto et al. | |
| 2005/0036941 A1 | 2/2005 | Bae et al. | |
| 2005/0037252 A1 | 2/2005 | Pham | |
| 2005/0058866 A1 | 3/2005 | Rocke et al. | |
| 2005/0074641 A1 | 4/2005 | Inai et al. | |
| 2005/0089415 A1 | 4/2005 | Cho | |
| 2005/0120621 A1 | 6/2005 | Lawson et al. | |
| 2005/0158595 A1 | 7/2005 | Marsh et al. | |
| 2005/0178061 A1 | 8/2005 | Tonca | |
| 2005/0181250 A1 | 8/2005 | Beckmann et al. | |
| 2005/0238573 A1 | 10/2005 | Zhang et al. | |
| 2006/0059778 A1 | 3/2006 | Shurtleff et al. | |
| 2006/0073365 A1 | 4/2006 | Kaye | |
| 2006/0110639 A1 | 5/2006 | Walter | |
| 2006/0127734 A1 | 6/2006 | McLean | |
| 2006/0172694 A1 | 8/2006 | Gau et al. | |
| 2006/0194082 A1 | 8/2006 | Tucker et al. | |
| 2006/0196112 A1 | 9/2006 | Berry | |
| 2006/0275645 A1 | 12/2006 | Gallagher | |
| 2007/0002172 A1 | 1/2007 | Calvignac et al. | |
| 2007/0020172 A1 | 1/2007 | Withers-Kirby | |
| 2007/0031711 A1* | 2/2007 | Miyata et al. | 429/25 |
| 2007/0036711 A1 | 2/2007 | Fisher et al. | |
| 2007/0037034 A1 | 2/2007 | Fisher et al. | |
| 2007/0042244 A1 | 2/2007 | Spallone | |
| 2007/0068071 A1 | 3/2007 | Kelly et al. | |
| 2007/0108056 A1 | 5/2007 | Nyberg et al. | |
| 2007/0120872 A1 | 5/2007 | Satoh | |
| 2007/0122668 A1 | 5/2007 | Suzuki et al. | |
| 2007/0166595 A1 | 7/2007 | Akiyama et al. | |
| 2007/0189960 A1 | 8/2007 | Yamamoto | |
| 2007/0264546 A1* | 11/2007 | LaVen | 429/22 |
| 2008/0025880 A1 | 1/2008 | Shurtleff et al. | |
| 2008/0044691 A1 | 2/2008 | Wake et al. | |
| 2008/0172932 A1 | 7/2008 | Kelly et al. | |
| 2008/0187798 A1 | 8/2008 | Mclean et al. | |
| 2008/0193804 A1 | 8/2008 | Suzuki et al. | |
| 2008/0203816 A1 | 8/2008 | Fujita | |
| 2008/0220297 A1 | 9/2008 | Sarata et al. | |
| 2008/0292541 A1 | 11/2008 | Kamada et al. | |
| 2009/0016216 A1 | 1/2009 | Ballard et al. | |
| 2009/0087706 A1 | 4/2009 | Gil et al. | |
| 2009/0092864 A1 | 4/2009 | Mclean et al. | |
| 2009/0117420 A1 | 5/2009 | Nakakubo | |
| 2009/0197125 A1 | 8/2009 | Salvador et al. | |
| 2009/0269634 A1 | 10/2009 | Fabian et al. | |
| 2009/0274595 A1 | 11/2009 | Fisher et al. | |
| 2009/0304558 A1 | 12/2009 | Patton et al. | |

(56) References Cited

U.S. PATENT DOCUMENTS

| | | | |
|---|---|---|---|
| 2010/0150824 A1 | 6/2010 | Withers-Kirby |
| 2010/0323254 A1 | 12/2010 | Mori et al. |
| 2011/0020215 A1 | 1/2011 | Ryu et al. |
| 2011/0053016 A1 | 3/2011 | Braithwaite et al. |
| 2011/0070151 A1 | 3/2011 | Braithwaite et al. |
| 2011/0159386 A1 | 6/2011 | Kaupert et al. |
| 2011/0200495 A1 | 8/2011 | Braithwaite et al. |
| 2011/0311895 A1 | 12/2011 | Spare et al. |
| 2011/0313589 A1 | 12/2011 | Iyer et al. |
| 2012/0100443 A1 | 4/2012 | Braithwaite et al. |

FOREIGN PATENT DOCUMENTS

| | | | |
|---|---|---|---|
| JP | 2002234358 A | 8/2002 |
| JP | 2002/234325 | 1/2006 |
| JP | 2006079891 A | 3/2006 |
| JP | 2007157587 A | 6/2007 |
| WO | 0128889 A1 | 3/2000 |
| WO | 04/001235 | 12/2003 |
| WO | 04001235 A | 12/2003 |
| WO | 2005049485 A | 6/2005 |
| WO | 2005057703 A | 6/2005 |
| WO | 2005123586 A | 12/2005 |
| WO | 2006093735 A | 9/2006 |
| WO | 2007021924 A | 2/2007 |
| WO | 2007021934 A | 2/2007 |
| WO | 2007035845 A | 3/2007 |
| WO | 2007055146 A | 5/2007 |
| WO | 2007109036 A | 9/2007 |
| WO | 2007120872 A | 10/2007 |
| WO | 2011011050 A | 1/2011 |
| WO | 2011028242 A | 3/2011 |
| WO | 2012054797 A | 4/2012 |
| WO | 2012058688 A | 5/2012 |

OTHER PUBLICATIONS

D.J. Laser and J.G. Santiago, "A Review of Micropumps", J. Micromech. Microeng.; vol. 14 (2004) R35-R64.

Ying, Wu, "Hydrogen Storage via Sodium Borohydride: Current Status, Barriers & R&D Roadmap", Presentation presented at GCEP, Stanford University, Apr. 14-15, 2003.

Definition of course work technical terms. Southwest Tech, 2002-2006. [Retrieved on Feb. 8, 2012]. Retrieved from the Internet <URL: http://www.swtc.edu/Ag_Power/hydraulics/terms.htm.

Schlesinger et al, "Sodium Borohydride, Its Hydrolysis and its Use as a Reducing Agent and in the Generation of Hydrogen," J. Am. Chem. Soc.; vol. 75 (Mar. 15, 1952), pp. 215-219.

Laser et al., "A Review of Micropumps," J. Micromech. Microeng.; vol. 14 (2004) R35-R64.

Wu, "Hydrogen Storage via Sodium Borohydride: Current Status, Barriers & R&D Roadmap," Presentation presented at GCEP, Stanford University, Apr. 14-15, 2003.

Amendola, S.C., A safe, portable, hydrogen gas generator using aqueous borohydride solution and Ru catalyst, 2000, Int'l journal of Hydrogen Energy, vol. 25, pp. 969-975.

* cited by examiner

US 9,034,531 B2

CONTROLLER FOR FUEL CELL OPERATION

CROSS-REFERENCE TO RELATED APPLICATIONS

This application is a Continuation in Part of and claims the benefit of U.S. patent application Ser. No. 12/322,337 filed Jan. 29, 2009, which is cross-referenced to and claims the benefit of U.S. Provisional Application 61/062,961 filed Jan. 29, 2008, which are hereby incorporated by reference in their entirety.

FIELD OF THE INVENTION

The invention relates generally to fuel cells. More particularly, the invention relates to a system for controlling a fuel cell in conjunction with an on demand hydrogen generator.

BACKGROUND

Fuel cell systems where oxygen is supplied from ambient air accumulate the non-reactive components of air (primarily nitrogen and some water vapor or condensation) in the fuel stream due to finite diffusion rates of gases through the fuel cell electrolyte. The inert gas accumulation eventually lowers the fuel cell output voltage due to drop of fuel concentration. As a consequence, continuous operation requires periodic purging of the fuel compartment. Additionally, fuel cell systems often employ safety valves that allow gas to escape if the internal pressure or vacuum builds to unsafe levels, preventing damage to the device and/or hazards to users. Two types of methods for addressing these issues include active and passive purge valves. In active purge systems, an electrically or mechanically controlled valve is employed at the outlet of the fuel gas flow path to allow the fuel and accumulated nitrogen to escape when necessary. In smaller micro-fuel cell systems, miniature valves are often used when minimum size and weight is desired, such as the X-Valve available from Parker Hannefin. These active valves suffer from a number of problems including high cost and high power consumption. Additionally, they are unreliable as a safety purge valve, as they require proper external control in order to function properly. Passive purge valve systems allow gas pressure or vacuum to be released at a specified pressure. Accumulated non-reactive gases can be purged by increasing the operating pressure of the system above the purge pressure of the valve, allowing gas to escape. These valves tend to be less expensive than active valves and do not require external control, making them more reliable. These passive valves include poppet valves, like those available from Smart Products and duck bill valves, like those available from Vernay. Nevertheless a purge system that is based on passive valves requires a good control of the pressure upstream of the purge valve to avoid fuel loss as well as excessive purging. In many hydrogen fuel cell systems, for example, hydrogen is generated on demand such as using binary chemical reactions. The response time of such systems is often characterized by latency and long time constants that are due to finite thermal mass and mass transfer limitations of the chemical hydrogen reactor systems. These limitations make frequent rapid pressure changes impossible and thus purging based on passive purge valves impractical.

Additionally, the current fuel cell systems often operate with hydrogen stored at elevated pressures, requiring high pressure rated gas routing, as well as down pressure regulators, that add system weight. Furthermore, high pressure hydrogen gas routing poses safety challenges in fault modes.

Accordingly, there is a need to develop a fuel cell control scheme that allows for active control of H2 pressure that minimizes safety risks, system complexity, and system weight, while it maintains high fuel utilization.

SUMMARY OF THE INVENTION

The current invention is a fuel cell controller that includes a first control loop, where the first control loop is disposed to adjust a fuel cell current to regulate a hydrogen output pressure from the fuel cell to a pressure target value, and further includes a second control loop disposed to adjust a hydrogen flow rate from a hydrogen generator to match a fuel cell power output to a power target value.

According to one aspect of the invention, the fuel cell can include a fuel cell, a fuel cell stack or a fuel cell planar array.

In a further aspect, the fuel cell controller includes a fuel cell having an on-demand hydrogen generator providing hydrogen to the fuel cell, a valve disposed at a hydrogen outlet of the fuel cell, a pressure monitor disposed to monitor hydrogen gas output from the fuel cell, an input power-draw adjustable DC/DC converter having a current and voltage monitor disposed to monitor the adjustable DC/DC converter, a rechargeable electrical energy storage device disposed to receive power from the adjustable DC/DC converter, a pressure controller, where the pressure controller is disposed to adjust a power draw from the fuel cell by adjusting power draw of the DC/DC controller according to a pressure readout from the pressure monitor and a target pressure value, and a hydrogen flow controller, where the hydrogen flow controller adjusts the hydrogen generation according to a current and voltage value from the DC/DC current and voltage monitor and a target power output value. Here, the on demand hydrogen generator has a hydrogen flow rate setpoint input and a hydrogen gas output. Further, the pressure monitor is disposed at a hydrogen gas outlet of the fuel cell, where the pressure monitor is disposed to convert a pressure in a hydrogen line into a readable pressure signal voltage. Additionally, the DC/DC converter includes a DC voltage input, a converter current control signal input, and a DC voltage output, where the DC/DC converter is disposed to adjust a DC/DC output voltage for a current into the DC/DC converter to equal a current set at a current control input value. Additionally, the rechargeable electrical energy storage device can include a capacitor, a battery or a combination thereof. The pressure controller includes an input from a fuel cell output pressure, a target pressure set point input and a DC/DC current control signal output. The hydrogen flow controller includes a DC/DC output voltage input, a DC/DC output current input, a target power set point input and a Hydrogen flow rate control output signal.

In another aspect of the invention, during operation, hydrogen from the hydrogen generator is fed to the fuel cell and hydrogen output from the fuel cell is connected to a purge valve and monitored by a pressure transducer and electrical output from the fuel cell is directly attached to an input of a DC/DC converter and an output of the DC/DC converter is connected to a battery and an optional external load.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention.

Accordingly, the following preferred embodiment of the invention is set forth without any loss of generality to, and without imposing limitations upon, the claimed invention.

Figure 1:
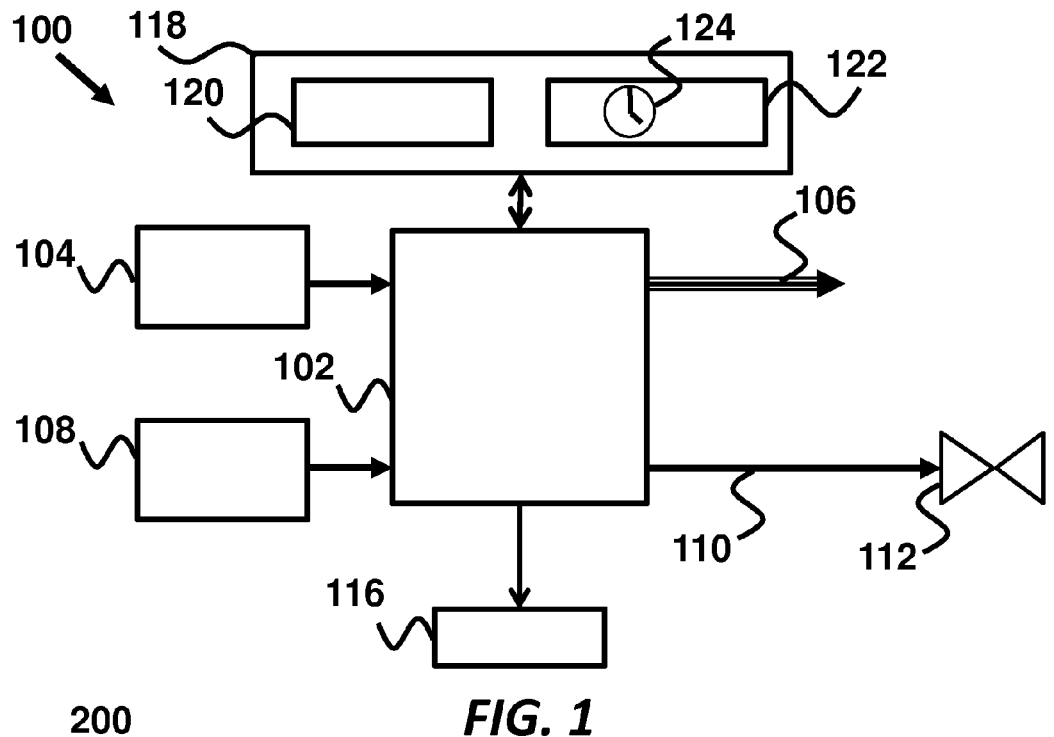
FIG. 1 shows a fuel cell gas purge system having detection for a completed purge based on a timer, according to the current invention.

Referring to the figures, FIG. 1 shows a timer-based fuel cell purge system 100 according one embodiment of the current invention. A hydrogen fuel cell 102 is shown that uses an air source 104 for oxygen input to the cathodes (not shown) and exhausted through an air output 106 in the form of humidified air, where the air source can be driven by a fan, for example. Here an exemplary hydrogen fuel cell 102 is shown, but it is understood throughout this description that the hydrogen fuel cell 102 can be any one of the many types of gas fuel cells, for example a propane fuel cell, a butane fuel cell or a methane fuel cell. It is further understood that the fuel cell can be a single fuel cell a fuel cell stack, an array of fuel cells or any combination thereof. The present embodiment is a hydrogen fuel cell gas purge system 100 that includes at least one hydrogen fuel cell 102. The system 100 further includes a hydrogen fuel supply 108, and an adjustable hydrogen fuel cell current load 116. The gas purge system 100 further includes at least one passive purge valve 112 disposed to purge accumulated non-fuel matter 110 in the fuel compartment of the hydrogen fuel cell 102, where the passive purge valve 112 operates according to a pressure differential across the passive purge valve 112. It is understood throughout this document that the non-fuel matter 110 can include non-fuel gases or condensed water. It is further understood in this document that the passive purge valve 112 can be a passive bi-directional valve, such as a dome valve, or a passive uni-directional valve. Further included is a purge management module 118 that includes a purge request module 120 and a purge complete module 122. The purge request module 120 determines when to increase the pressure of the hydrogen fuel to initiate the purge, and the purge complete module 122 determines when to decrease the pressure of the hydrogen fuel to complete the purge. Here, the non-fuel matter 110 can include non-fuel gases or condensed water. According to the current invention many methods exist to determine when purge gases comprise primarily the fuel. In the current embodiment, the purge complete module 122 can determine when the non-fuel material 110 has been purged, by using a timer 124. Here, the duration of the timer 124 is determined according to a current load in one hydrogen fuel cell before the purge was initiated. The current load before purge is indicative of the hydrogen flow-rate before purge occurred. Based on the hydrogen flow-rate and known volume of fuel cell anode, the necessary duration of the purge can be determined.

Figure 2:
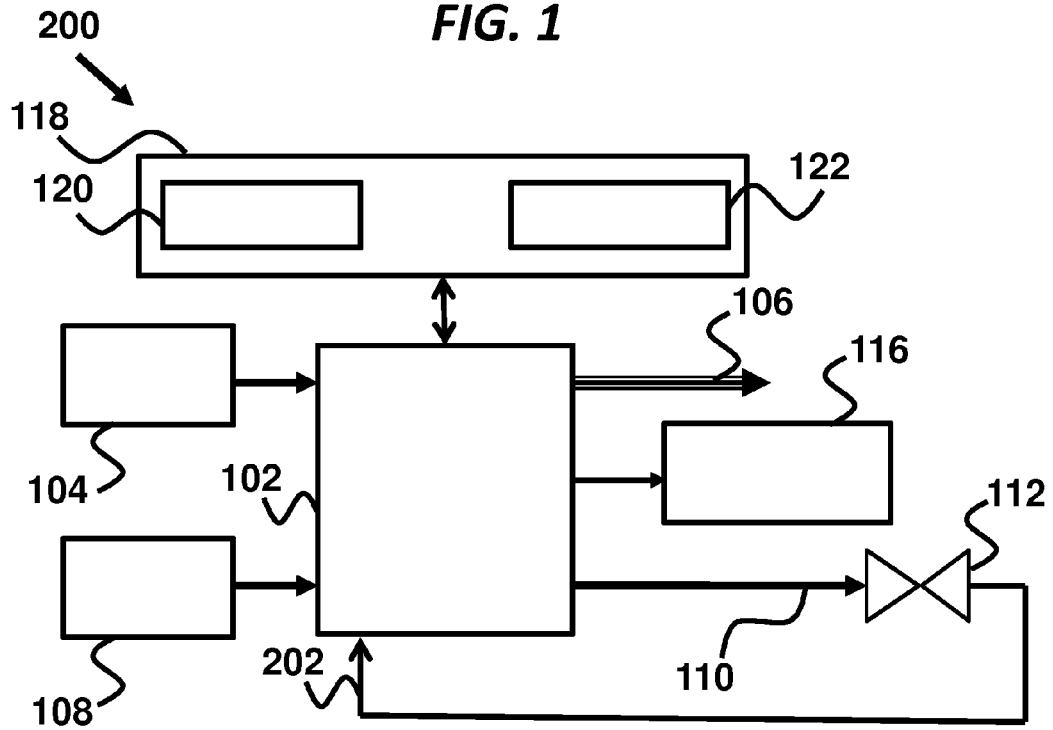
FIG. 2 shows a fuel cell gas purge system having completed purge detection according to the present invention.

FIG. 2 shows a hydrogen fuel cell gas purge system 200 having detection for a completed purge. The end of purge detection fuel cell gas purge system 200 includes at least one hydrogen fuel cell 102, a hydrogen fuel supply 108, and an adjustable hydrogen fuel cell current load 116. The system 200 further includes at least one passive purge valve 112 disposed to purge accumulated non-fuel matter 110 in the hydrogen fuel cell 102. Further included is a purge management module 118 that includes a purge request module 120 and a purge complete module 122. The purge request module 120 determines when to increase the pressure of the hydrogen fuel to initiate the purge, and the purge complete module 122 determines when to decrease the pressure of the hydrogen fuel to complete the purge. According to the current embodiment, the purge request module 120 determines when the non-fuel matter 110 needs to be purged by sensing when a voltage in the fuel cell 102, for example the voltage of one fuel cell of a fuel cell stack, drops below a predetermined threshold.

While not purging, the adjustable hydrogen fuel cell load 116 is adjusted to keep the pressure that is upstream of the passive purge valve 112 below its cracking pressure, effectively matching the fuel flow-rate consumed by the fuel cell 102 to the fuel flow-rate of the fuel generator 108, while during the purge, the adjustable hydrogen fuel cell load 116 is adjusted to increase the pressure upstream of the passive purge valve 112 above the cracking pressure. This can be done by decreasing the fuel consumption by the fuel cell 102 (reducing the fuel cell load current) while keeping the generated fuel flow-rate constant, which leads to fuel pressure buildup. The adjustments of the current load can be done rapidly, and thus rapid variations of the fuel pressure are possible, which means that quick, controlled purges are possible.

According to the embodiment shown in FIG. 2, the passive purge valve 112 is disposed at the distal end of the fuel cell stack 102 having the hydrogen fuel 108 connected in parallel, where hydrogen fuel source 108 is disposed at a proximal end of the fuel stack 102. Here, the purge request module 120 determines when the non-fuel material 110 needs to be purged by sensing when a voltage of any of the fuel cells in the stack 102 drop below a predetermined threshold when under a load. For example, the purge request module 120 can determine when the non-fuel matter 110 needs to be purged by sensing when a voltage in the fuel cell 102 that is most proximal to the passive purge valve 112 drops below a predetermined threshold.

FIG. 2 shows a hydrogen fuel cell gas purge system 200 having purge detection, where the purge valve outlet 202 is routed over the cathode (not shown) of one or more of the cells 102 in the fuel cell system 200, having an adjustable load 116. Initially, when inert gas and other non-fuel matter 110 such as water vapor/condensation, is being purged over the cell cathode the cell voltage is minimally affected, in particular at low or no loads. Once all of the non-fuel matter 110 has been purged and instead pure hydrogen is being purged, it catalytically reacts with the air-present oxygen at the cathode catalyst layer; effectively starving the cell of oxygen. This creates a detectable decrease in cell voltage particularly in passive natural convection driven cathode flow systems (see FIG. 3), which can be used to confirm that a successful purge occurred, as hydrogen will only be released after the accumulated non-fuel matter 110 is purged, where nitrogen, for example, tends to collect at the end of the flow path. Purging hydrogen over the cell cathode also has beneficial effects on the operation of the cell 102, since hydrogen reduces catalyst contaminants such as oxides.

According to one embodiment, the purge exhaust 202 can be directed over the open cathode of the fuel cell 102 by a variety of means included but not limited to tubing routing the gas from the purge valve 112 to the surface of the cell 102 or positioning the purge valve 112 such that the exhaust 202 directed over the cell 102 is used for detecting purges.

The output of the purge valve 202 placed over the cathode of the fuel cell 102 can be placed in many positions over the cathode including on the center of the cell and closer to the edges. When the exhaust is placed closer to the edge of a cell 102, it is less sensitive to detecting purges, as the purged fuel gas can escape more readily. This can be advantageous in cases when there is limited control of the pressure of the fuel gas, potentially leading to excessive amounts of gas to be purged over the cell 102, and thus limiting the power output of that cell 102.

Figure 3:
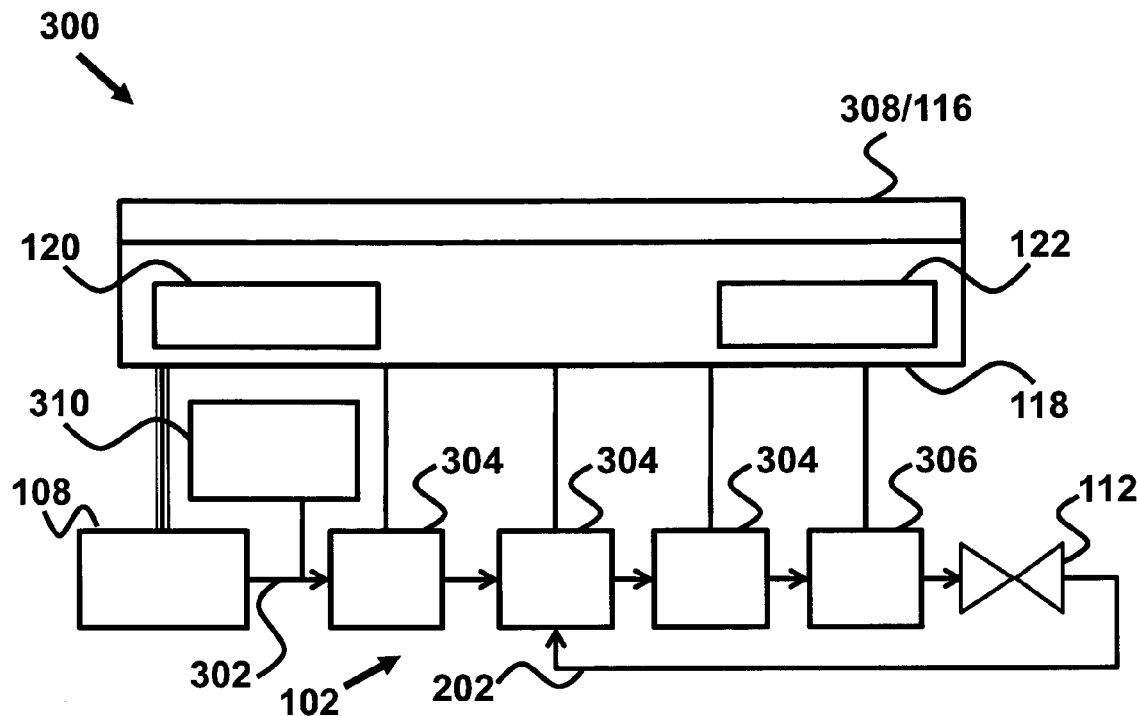
FIG. 3 shows a multiple discrete cell system that has the purge exhaust routed to one or more different cells in the system according to the present invention.

FIG. 3 shows a multiple discrete cell system 300, according to the current invention, that has the purge exhaust 202 routed to one or more different cells 304 in the system 300. In many fuel cell systems, such as with a fuel cell array 102, multiple cells are connected with serial fuel-gas flow 302, with a pressure sensor 310, and have a natural convection driven cathode flow systems. When the purged non-fuel matter 110 from the passive purge valve 112 is directed across one fuel cell 304 in the array 102 that is upstream from the passive purge valve 112, the purge complete module 118 determines when the non-fuel matter 110 has been purged by sensing when a voltage of the upstream fuel cell 304 drops below a threshold voltage. As shown, the passive purge valve 112 is disposed at a distal end of at least two hydrogen fuel cells 102 having the hydrogen fuel connected in series, where a source 108 of the hydrogen fuel is disposed at a proximal end of the array. In the types of systems shown in FIG. 3, nitrogen gas will accumulate in the last cell 306 over time, eventually causing its voltage and power output to fall. As a result, routing the purge exhaust 202 over the last cell 306 in the array 102 can be problematic, as the purge detection module cannot distinguish between a voltage drop due to needing a purge (due to accumulated nitrogen on the anode side) or having successfully completed a purge (due to catalytic oxygen starvation a the air side). According to one embodiment, it is preferable to use one of the first cells 304 in the array 102 (in order of receiving gas flow).

According to one embodiment, the adjustable hydrogen fuel cell load 116 can include a battery charger circuit attached to a battery 308, where a charging current of the battery 308 can be adjusted. One aspect here is that the battery 308 is not charged based on what it should be charged, for example with constant current etc., rather based on how much hydrogen is generated. Here, the battery 308 serves as a readily available energy storage needed to keep the pressure upstream of the purge valve 112 below cracking pressure as well as a hybridizing device that can support continuous (no power output interrupts during purges) as well as peak power output from the fuel cell system to an external user load.

According to the current invention, a number of methods exist for detecting the presence of hydrogen gas over the cathode of a fuel cell, a fuel cell stack or a fuel cell array. One method involves measuring the voltage of one cell and comparing it to surrounding cells. When the voltage of the cell receiving the purge output is substantially lower than its neighboring cells and the system pressure is within the range in which a purge is expected, it can be reliably concluded that the purge was successful.

Figure 4:
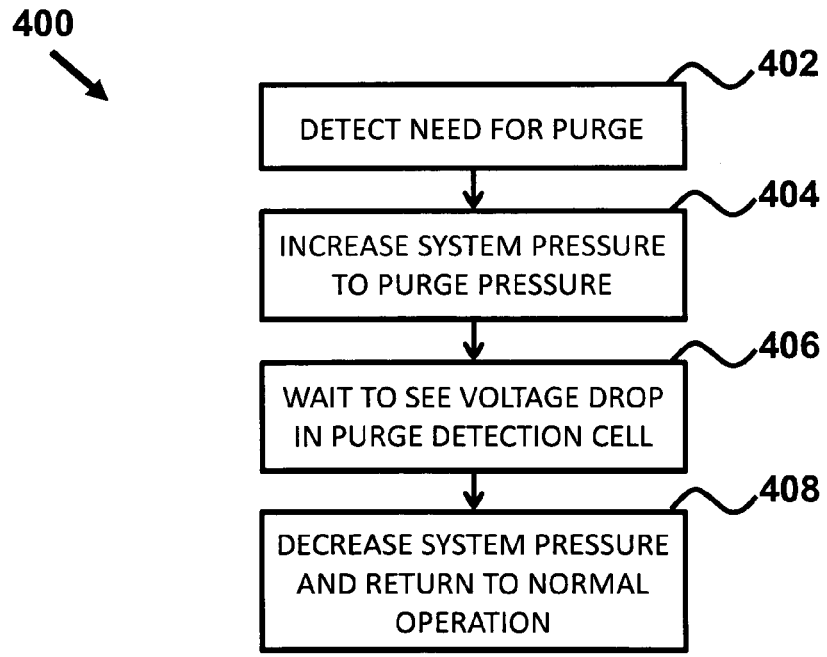
FIG. 4 shows a flow diagram of a software algorithm to monitor the system and use the voltage data from the purge cell to determine when a purge has been effectively completed, according to the current invention.

One scheme for using the output of the purge detection method disclosed is to use a software algorithm to monitor the system and use the voltage data from the purge cell to determine when a purge has been effectively completed. One possible control scheme, without limitation, is the flow diagram 400 shown in FIG. 4. In this scheme the system CPU would first detect the need for a purge 402, generally looking for a voltage decrease in the last cell. The system CPU would then increase the system pressure 404. The means for doing this vary with the type of system. In one representative hydrogen fueled system, in which the hydrogen is produced on demand using a binary chemical reaction between a liquid and a solid, the system pressure can be increased by increasing the rate with which the hydrogen is produced, which is in turn done by increasing the rate that the fluid is pumped into the chamber containing the reactive solid. Alternatively, the system pressure can be increased by keeping the rate of hydrogen production constant, and decreasing the rate with which the hydrogen is consumed by reducing the load on the fuel cell system, which is accomplished with the adjustable load 116 shown in FIG. 2 and FIG. 3. In systems where there is a significant degree of latency in the hydrogen production rate, reducing the load to increase system pressure is the preferred embodiment. Once the pressure has increased above a minimum threshold purge pressure, the system CPU waits to see a voltage drop in the purge detection cell 406, indicating a successful purge. The system can then either reduce the pumping rate or increase the load on the fuel cells to bring the system pressure back below the purge pressure 408 in order to prevent the purging of excess hydrogen.

The present invention uses at least one passive valve that allows flow in two directions at predetermined pressures. In one possible embodiment, a dome type valve is used as a passive purge valve in the fuel cell system. Dome valves allow flow in both directions once predetermined pressure thresholds are reached, enabling a single valve to be used for pressure relief, purging, and vacuum relief. A preferred cracking pressure for purging can be as low as 1 PSI.

The purge valve assembly can be a standalone part or integrated into another assembly. In one embodiment, the dome valve could be a silicone quadricuspid dome valve. These valves offer the additional benefits of being low cost and sealing reliably at very low pressures. Dome valves offer an additional benefit of some hysteresis in closing. This enables more rapid purges, which can be beneficial in fuel cell systems with parallel flow field structures.

Figure 5:
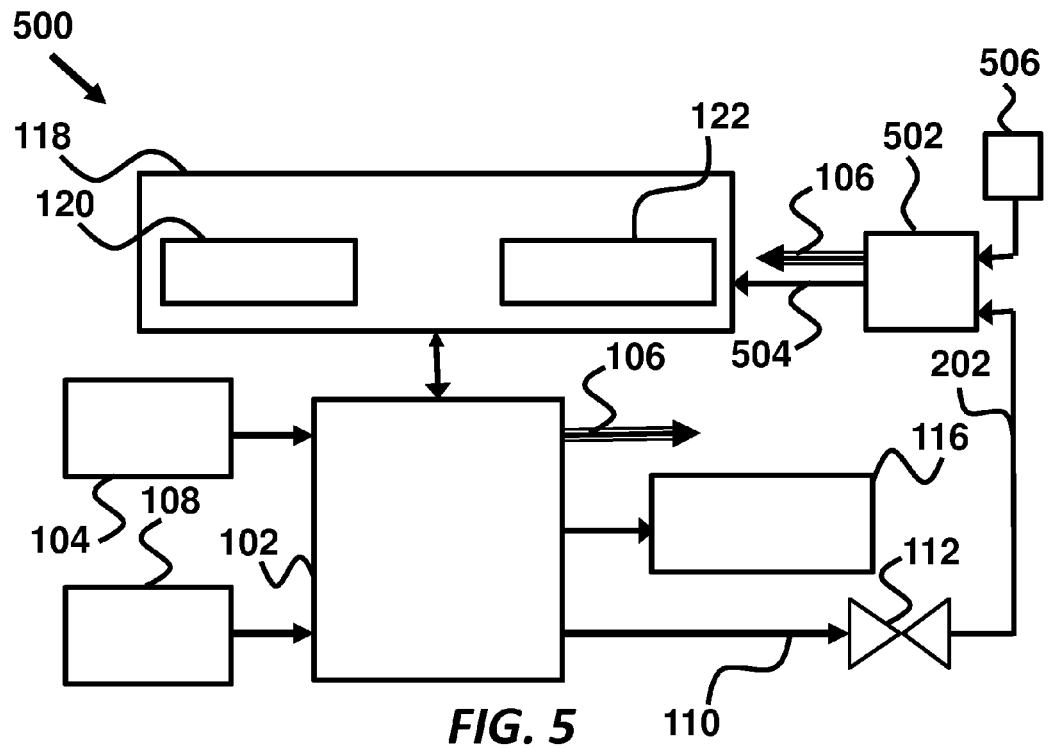
FIG. 5 shows a fuel cell gas purge system that has the purge exhaust routed to an anode of an auxiliary fuel cell, according to the current invention.

FIG. 5 shows an auxiliary fuel cell embodiment 500 that includes a purge exhaust 202 routed to an anode of an auxiliary fuel cell 502, while the cathode of the auxiliary fuel cell 502 is supplied with oxygen by air, either from an active air-move 506 such as a fan or preferably passively by diffusion. The purge exhaust 202 from the passive purge valve 112 is directed to a hydrogen sensor such as an anode of an auxiliary fuel cell 502, where the purge complete module 122 determines when the non-fuel matter 110 has been purged by sensing when the output 504 of the auxiliary fuel cell 502 exceeds a threshold level, where the output 504 can be either voltage or current. Initially when inert gas and other non-fuel matter 110 such as water vapor/condensation, is being purged into the anode the open cell voltage of the auxiliary fuel cell 502 is low and cell current when loaded is minimal. Once all of the inert gas 110 has been purged and instead pure hydrogen is being purged the open cell voltage of the auxiliary cell 502 increases and the cell current under load increases appreciably. Comparing the load current of the auxiliary cell 502 to a threshold value can indicate hydrogen purity in the purge stream.

Figure 6:
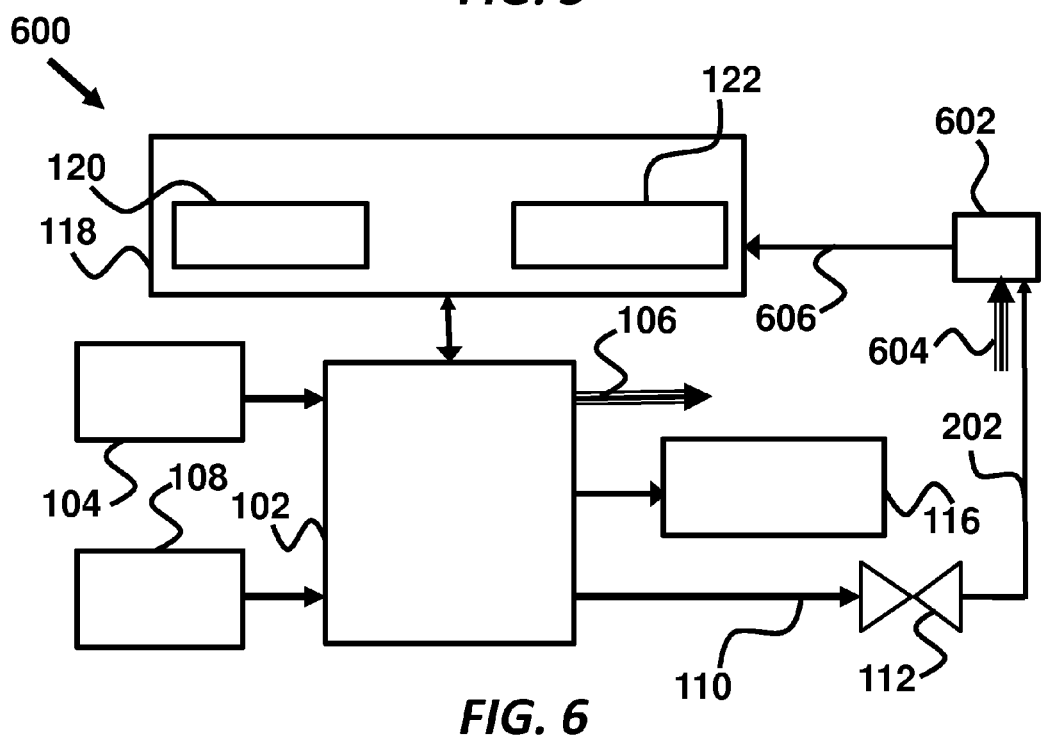
FIG. 6 shows a fuel cell gas purge system that has the purge exhaust routed to a catalyst bed in the presence of ambient air, according to the current invention.

According to another embodiment FIG. 6 shows a catalyst bed embodiment 600 that includes a purge exhaust 202 routed to a catalyst bed 602 in the presence of ambient air 604. Here the purge complete module 122 determines when the non-fuel matter 110 has been purged by sensing when the temperature 606 of the catalyst bed 602 exceeds a threshold level. The structure of the catalyst bed allows mixing of the purge exhaust 202 with ambient air 604 e.g. by diffusion, or venturi entraining. Initially, when inert gas and other non-fuel matter 110 such as water vapor/condensation, is being purged into the catalyst bed the gases pass through the catalyst bed without any reaction. Once all of the inert gas 110 has been purged and instead pure hydrogen is being purged, the hydrogen mixed with oxygen from ambient air catalytically combust at the catalyst bed, releasing heat and water vapor. The measured temperature increase 606 of the catalyst bed 602 is a good indication of hydrogen purity in the purge stream. The catalysts suitable for this method are selected from the Platinum group, oxides of silver, cobalt, manganese or any other catalyst with suitable catalytic reactivity at room temperature.

Figure 7:
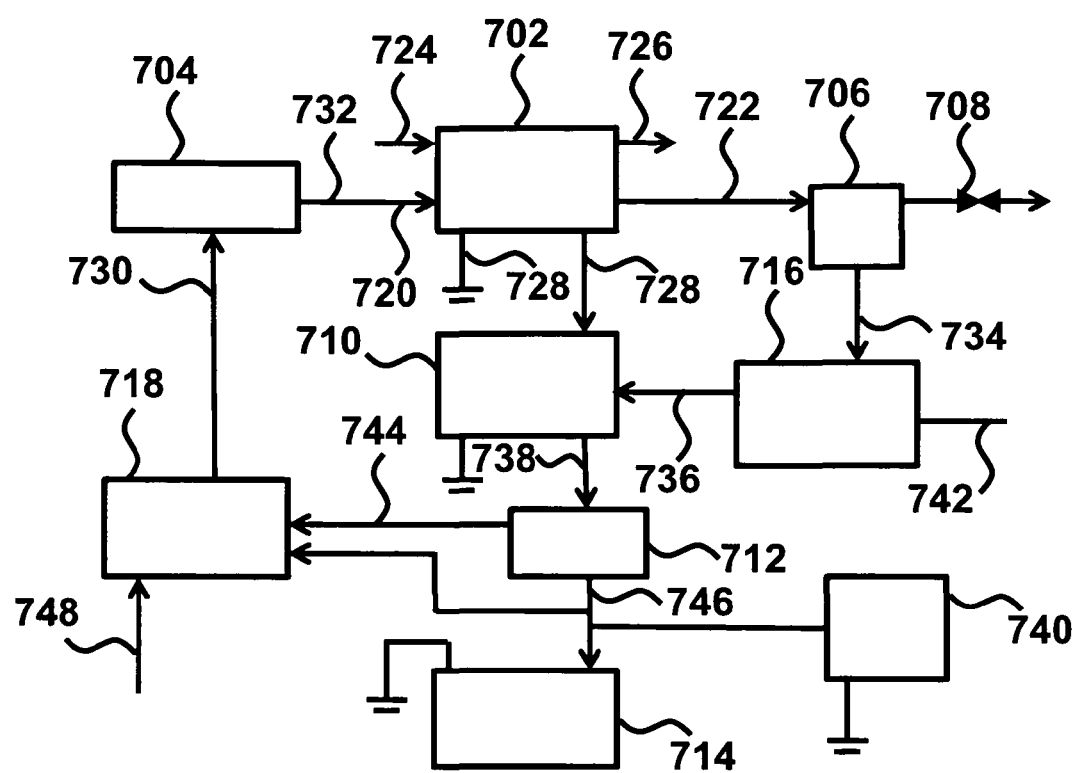
FIG. 7 shows a fuel cell control system, according to the current invention.

In another aspect of the invention, a fuel cell controller 700 is shown in FIG. 7. The fuel cell controller 700 can include a fuel cell stack 702 (or a planar array of fuel cells 702), regulated on-demand hydrogen generator 704, a pressure monitor 706, a purge valve 708, DC/DC converter 710, DC/DC current and voltage monitor 712, rechargeable electrical energy storage device 714, output pressure controller 716, and hydrogen flow controller 718.

The fuel cell 702 has hydrogen inlet 720 and hydrogen outlet 722, oxidant inlet 724 and oxidant outlet 726, and electrical output tabs 728. The fuel cell 702 converts chemical energy from the reactant stream into an electrical stream. In this example it is understood that sufficient amounts of oxidant are available at the fuel cell cathode.

The on demand hydrogen generator 704 has one input, the hydrogen flow rate setpoint 730, and one hydrogen gas output 732.

The pressure monitor 706 located at the outlet 722 of the fuel cell stack or array 702 converts the pressure in the hydrogen line into a readable pressure signal 734 e.g. voltage.

The DC/DC converter 710 has two inputs, input DC voltage 728 and converter current control signal input 736, and one output: output DC voltage 738. The DC/DC converter 710 adjusts its output voltage 738 so that the current into the converter 710 equals the current set at its current control input 736.

The rechargeable electrical energy storage device 714, such as a capacitor, a battery or a combination thereof, acts as a transient energy storage device independent of the external load 740.

The pressure controller 716 has two inputs, fuel cell stack hydrogen output pressure 734 and target pressure set point 742, and one output: DC/DC current control signal 738.

The $H_2$ flow controller 718 has three inputs: DC/DC output voltage 746, DC/DC output current 744, and target power set point 748, and a single output: hydrogen flow rate control signal 730.

During operation, the hydrogen from the $H_2$ generator 704 is fed to the fuel cell stack or array input 720. The fuel cell stack or array hydrogen output 722 is connected to a purge valve 708 and monitored by the pressure transducer 706. The electrical output 728 from the fuel cell stack or array 702 is directly attached to the input of the DC/DC converter 710.

The output 738 of the DC/DC converter 710 is further connected to the battery 714 and an optional external load 740.

The fuel cell controller 700 maintains constant fuel cell output pressure 722 while regulating the system output power, that is measured at the power output 738, to a predetermined set point 748. In detail, the controller 700 includes two control loops. The first loop adjusts the fuel cell current in order to regulate the output pressure to a target value 742. The second loop adjusts the hydrogen generation flow rate to match the DC/DC power output 738 to a target value 748. The target output power value 748 can be dynamically determined, based on several criteria: current and/or predicted power draw from the load, state of charge of the system battery, remaining capacity of the $H_2$ generator, user input.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art.

All such variations are considered to be within the scope and spirit of the present invention as defined by the following claims and their legal equivalents.

What is claimed:

1. A fuel cell system, comprising:
   a fuel cell comprising an inlet and an outlet;
   an on-demand hydrogen generator fluidly connected to the fuel cell inlet that generates hydrogen and provides the hydrogen to said fuel cell, the hydrogen generator operable between a set of fuel flow rates from the hydrogen generator;
   a passive valve fluidly connected to the outlet of said fuel cell, the valve having a cracking pressure;
   a pressure monitor, fluidly connected to the outlet of the fuel cell, that monitors output pressure from said fuel cell;
   an adjustable load electrically connected to the fuel cell, operable between a purge mode wherein a fuel cell current draw is decreased to increase the output pressure beyond the cracking pressure and a non-purge mode wherein the fuel cell current draw is increased to decrease the output pressure below the cracking pressure;
   a pressure controller, receptively connected to the pressure monitor and operatively connected to the adjustable load, configured to control the adjustable load between the purge mode and the non-purge mode based on a control signal determined from a fuel cell output pressure readout from said pressure monitor and a target pressure value;
   a current and voltage monitor that monitors the current and voltage of the power draw; and
   a hydrogen flow controller receptively connected to the current and voltage monitor and operatively connected to the hydrogen generator, configured to control the hydrogen generator between the set of fuel flow rates based on a monitored current and voltage value from the current and voltage monitor and a target power output value.

2. The fuel cell system of claim 1, wherein said on demand hydrogen generator has a hydrogen flow rate setpoint input and a hydrogen gas output.

3. The fuel cell system of claim 1, wherein said pressure monitor is disposed to convert a pressure in a hydrogen line into a readable pressure signal voltage.

4. The fuel cell system of claim 1, wherein the adjustable load comprises an adjustable DC/DC controller that controls the fuel cell current and a rechargeable electrical energy storage device that receives power from the adjustable DC/DC controller.

5. The fuel cell system of claim 4, wherein said rechargeable electrical energy storage device is selected from the group consisting of a capacitor, a battery and a combination thereof.

6. The fuel cell system of claim 1, wherein said pressure controller comprises an input from a fuel cell output pressure, a target pressure set point input and a DC/DC current control signal output.

7. The fuel cell system of claim 1, wherein said hydrogen flow controller comprises a DC/DC output voltage input, a DC/DC output current input, a target power set point input and a hydrogen flow rate control output signal.

8. The fuel cell system of claim 4, wherein said DC/DC converter comprises a DC voltage input, a converter current control signal input, and a DC voltage output, wherein said DC/DC converter is disposed to adjust a DC/DC output voltage for a current into said DC/DC converter to equal a current set at a current control input value.

9. A control system for a fuel cell system that includes a fuel cell, the control system comprising:
   a hydrogen generator that generates hydrogen and fluidly couples to a fuel cell inlet;
   a passive valve fluidly connected to a fuel cell outlet, the passive valve having a cracking pressure;
   a pressure controller operatively connected to an adjustable load and configured to control the adjustable load between a purge mode and a non-purge mode based on a control signal determined from a measured output pressure from the fuel cell and a target pressure;
   the adjustable load electrically connected to the fuel cell and operable between the purge mode wherein a power draw on the fuel cell is decreased to increase the output pressure above the cracking pressure and the non-purge mode wherein the power draw on the fuel cell is increased to decrease the output pressure below the cracking pressure; and
   a hydrogen flow controller operatively connected to the hydrogen generator that adjusts hydrogen generation based on a current and voltage of the power from the fuel cell.

10. The control system of claim 9, wherein the adjustable load adjusts a current draw from the fuel cell to adjust the power draw from the fuel cell.

11. The control system of claim 10, wherein the adjustable load comprises a DC/DC adjustable controller that provides power to a rechargeable electrical energy storage device.

* * * * *